United States Patent
Ishiko et al.

(10) Patent No.: US 6,190,804 B1
(45) Date of Patent: Feb. 20, 2001

(54) SOLID BATTERY

(75) Inventors: Eriko Ishiko, Hyogo; Michiyuki Kono, Osaka; Tsutomu Sada, Shiga, all of (JP)

(73) Assignee: Dai-Ichi Kogyo Seiyaku Co., Ltd., Kyoto (JP)

( * ) Notice: Under 35 U.S.C. 154(b), the term of this patent shall be extended for 0 days.

(21) Appl. No.: 09/203,653

(22) Filed: Dec. 1, 1998

(30) Foreign Application Priority Data

Dec. 9, 1997 (JP) .................................................. 9-338685

(51) Int. Cl.$^7$ ...................................................... H01M 6/18
(52) U.S. Cl. ............................ 429/306; 429/304; 429/307
(58) Field of Search .................... 429/304, 306, 429/307

(56) References Cited

U.S. PATENT DOCUMENTS

| 5,436,090 | * | 7/1995 | Kono et al. | 429/191 |
| 5,527,639 | * | 6/1996 | Noda et al. | 429/192 |

FOREIGN PATENT DOCUMENTS

| 63-094501A | 4/1988 | (JP) . |
| 3-177409A | 8/1991 | (JP) . |
| 5-178948A | 7/1993 | (JP) . |

* cited by examiner

Primary Examiner—Yogendra Gupta
Assistant Examiner—John M Petruncio
(74) Attorney, Agent, or Firm—Jordan and Hamburg LLP

(57) ABSTRACT

A solid battery using a solid electrolyte obtained by dissolving a tetrafunctional high-molecular compound and an electrolyte salt in a solvent and crosslinking the solution by the irradiation of an actinic radiation and/or by heating, wherein the solid electrolyte is one obtained by using a tetrafunctional terminal acryloyl-modified alkylene oxide polymer having a high-molecular chain represented by following formula (I) as the above-described tetrafunctional high-molecular compound, compounding the solvent with the polymer at a ratio of from 220 to 1,900% by weight to the above-described tetrafunctional high-molecular compound, and crosslinking the compounded mixture:

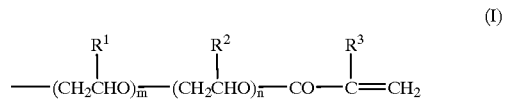

wherein $R^1$ and $R^2$ each represents a hydrogen atom or a lower alkyl group; $R^3$ represents a hydrogen atom or a methyl group; m and n each represents 0 or an integer of at least 1; in one high-molecular chain, $m+n \geq 35$.

The solid battery has a high performance and a high-energy density, prevents the occurrence of liquid leakage and gas spouting, and has an excellent mechanical strength.

4 Claims, 1 Drawing Sheet

SOLID BATTERY

FIELD OF THE INVENTION

The present invention relates to a solid battery using a high-molecular weight solid electrolyte excellent in the ion conductivity.

BACKGROUND OF THE INVENTION

A solid battery using a high-molecular solid electrolyte has recently come into the limelight because the solid battery has the merits that the possibility of the occurrences of a liquid leakage, igniting, gas spouting, etc., is generally low as compared with a battery using a conventional electrolytic solution and can ensure a higher reliability about safety. However, because the electric conductivity of the solid electrolyte is relatively low as compared with that of a conventional electrolytic solution, the internal resistance of the solid electrolyte becomes high, when the solid electrolyte is used for a solid battery, only the battery having a very small capacity is obtained, which closes the application of a solid electrolyte for a thin and light solid battery having a high capacity.

To develop a high-capacity battery using a solid electrolyte, a solid electrolyte obtained by mixing an acryloyl-modified high-molecular compound having an alkylene oxide polymer chain, an electrolyte salt, and further a solvent optionally, and crosslinking the mixture by the action of heat, light, electron beams, etc., is proposed. As conventional techniques, there are, for example, a high-molecular solid electrolyte by a combination of a trifunctional polymer having a terminal acryloyl-modified alkylene oxide polymer chain, a low-molecular alkylene oxide copolymer, polyvinyl chloride, an electrolyte salt, etc., as described in Japanese Patent Laid Open No. 3-177409; a solid electrolyte by a combination of a terminal acryloyl-modified alkylene oxide copolymer, an inorganic ion salt, and an organic solvent such as propylene carbonate, etc., as described in Japanese Patent Laid Open No. 63-94501; and a solid electrolyte by a combination of a difunctional and/or monofunctional high-molecular compound having terminal acryloyl-modified alkylene oxide polymer chain and an electrolyte salt as described in Japanese Patent Laid Open No. 5-178948. However, these solid electrolytes are not always satisfactory ones from the view points of a high capacity and a high mechanical strength.

SUMMARY OF THE INVENTION

The present invention has been made under these circumstances, and an object of the present invention is to provide a high-performance solid battery having a high capacity, an improved stability of the performance, and also an excellent mechanical strength by using a novel solid electrolyte.

As the result of making various investigations for solving the above-described problems of the conventional solid batteries, the present inventors have discovered that by using a solid electrolyte obtained by adding specific ratios of a solvent and an electrolyte salt to a tetrafunctional terminal acryloyl-modified high-molecular compound having an alkylene oxide polymer chain made up of at least a specific number of monomer units and fixing the solvent by crosslinking the mixture by an actinic radiation such as light, electron, etc., and/or by heating, solid battery which is excellent in the mechanical strength and has an excellent performance such as the electric conductivity comparable to a conventional liquid electrolyte is obtained and accomplished the present invention.

That is, the solid battery of the present invention is a solid battery using a solid electrolyte obtained by dissolving a tetrafunctional high-molecular compound and an electrolyte salt in a solvent and crosslinking the solution by the irradiation of an activating radiation and/or by heating, wherein the solid electrolyte is one obtained by using a tetrafunctional terminal acryloyl-modified alkylene oxide polymer having a high-molecular chain represented by following formula (I) as the above-described tetrafunctional high-molecular compound, compounding the solvent with the polymer at a ratio of from 220 to 1,900% by weight to the above-described tetrafunctional high-molecular compound, and crosslinking the compounded mixture:

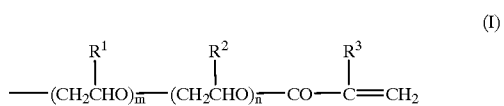

wherein $R^1$ and $R^2$ each represents a hydrogen atom or a lower alkyl group; $R^3$ represents a hydrogen atom or a methyl group; m and n each represents an integer of at least 0; in each high-molecular chain, $m+n \geqq 35$; and each of plural $R^1$, $R^2$, $R^3$, m, and n in the four high-molecular chains may be the same or different.

The solid battery of the present invention, as shown embodied as a test cell in FIG. 1, has a composite positive electrode 2 made up of a positive electrode composite containing a positive electrode active substance and the solid electrolyte, and between the composite positive electrode 2 and a negative electrode 4, the solid electrode can exist as a separator 3 in the solid battery of the present invention. In this case, as the negative electrode 4, a composite negative electrode made up of a negative electrode composite containing a negative electrode active substance and the solid electrode can be used. The test cell further includes a charge collectors 1 and 5, and leads 6 and 7.

As the solvent, one or more kinds selected from the group consisting of cyclic esters, cyclic carbonic esters, cyclic ethers, nitrites, chain ethers, chain carboxylic esters, chain carbonic esters, sulfolane, sulfolane derivatives, dimethyl sulfoxide, N,N-dimethylformamide, and N-methyloxazolidinone are preferably used.

DETAILED DESCRIPTION OF THE INVENTION

Figure 1:
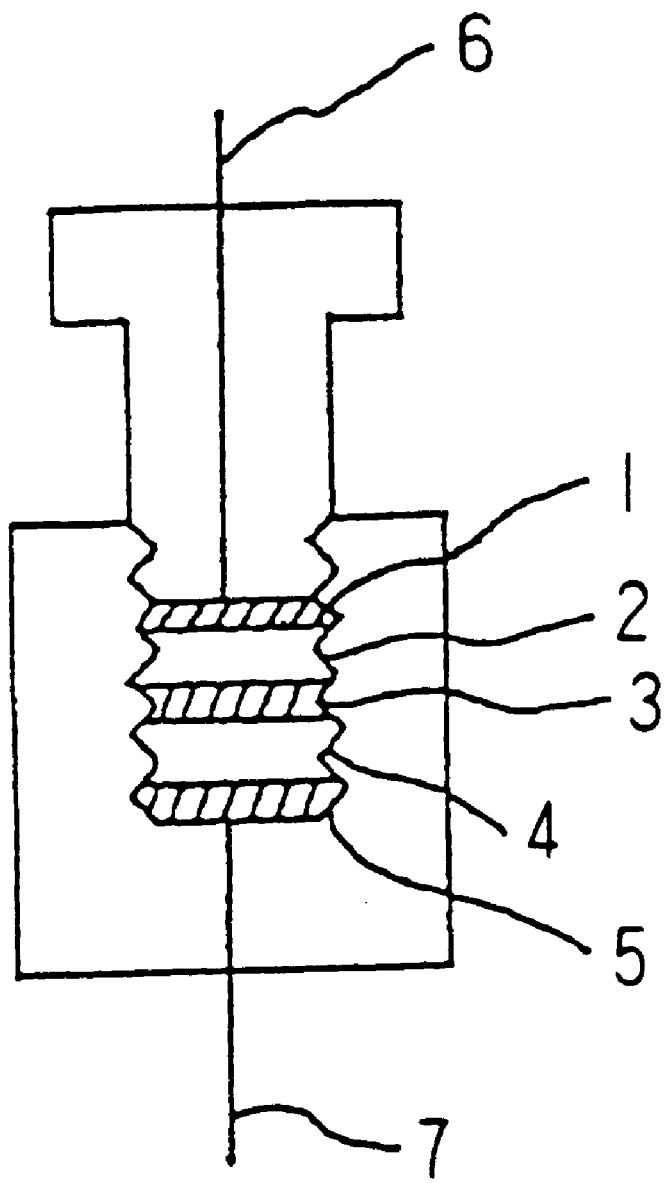
FIG. 1 is a schematic view showing an embodiment of the solid battery of the present invention.

Then, the present invention is described in detail.

The tetrafunctional terminal acryloyl-modified alkylene oxide polymer used for the solid electrolyte constituting the solid battery of the present invention is a compound obtained, for example, by using an active hydrogen compound such as diglycerol, pentaerythritol, and the like as a starting material, adding an alkylene oxide described hereinbelow to the active hydrogen compound, and subjecting it to esterification with an unsaturated organic acid such as acrylic acid, methacrylic acid, etc., or to dehydrochlorination with an acid chloride such as methacrylic acid chloride, etc. Practically, as the tetrafunctional terminal acryloyl-modified alkylene oxide polymer, there are, for example, the compounds represented by following formula (II):

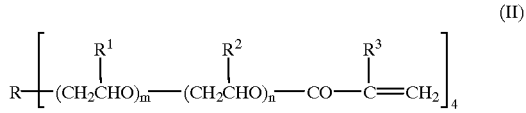

wherein $R^1$, $R^2$, $R^3$, m, and n have the same meanings as those of the formula (I) described above; and $R^1$, $R^2$, $R^3$, m and n each of which occurs four times in one molecule may be the same or different.

Specific examples of the polymer are compounds of the formula (II) wherein R, $R^1$, $R^2$, $R^3$, m, and n are as follows.

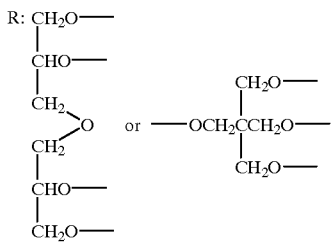

$R^1$: H, $CH_3$, or $C_2H_5$
$R^2$: H, $CH_3$, or $C_2H_5$
$R^3$: H or $CH_3$
m: 0 to 130
n: 0 to 130

The active hydrogen compound used as the starting material for the above-described compound may be a compound having four functional groups, and there is no particular restriction on the kind of the compound, but from the point of a good reactivity with an alkylene oxide, diglycerol, pentaerythritol, etc., are preferred, and as other compounds, methylglucoside, ethylenediamine, aromatic diamines, etc., can also be used.

The alkylene oxides used for the synthesis of the tetrafunctional alkylene oxide polymers include ethylene oxide, propylene oxide, butylene oxide, 1,2-epoxyhexane, 1,2-epoxyoctane, etc., and ethylene oxide, propylene oxide, and butylene oxide are particularly preferred. Also, it is necessary that the number of the monomers is at least 35, preferably from 40 to 120, per functional high-molecular chain, that is, the polyalkylene oxide chain of the tetrafunctional alkylene oxide polymer.

If the number of the monomer units is less than 35, there is a problem that it is difficult to crosslink the mixture of the polymer and a solvent of at least 220% by weight to the polymer, or the bleed-out of the solvent onto the surface of the crosslinked product becomes severe. In addition, in case of using two kinds of monomers, the disposition of the monomer units of the polymer may be a block type or a random type.

As the solvent used for the solid electrolyte, any solvents having a compatibility with the polymer can be suitably used but from the points that an ionic compound is soluble and that the solvent is excellent in the conductivity, one or more kinds selected from the group consisting of cyclic esters, cyclic carbonic esters, cyclic ethers, nitrites, chain ethers, chain carboxylic esters, chain carbonic esters, sulfolane, sulfolane derivatives, dimethyl sulfoxide, N,N-dimethylformamide, and N-methyloxazolidinone are preferably used, and in these solvents, cyclic esters and cyclic carbonic esters are particularly preferred.

The compounding ratio of the solvent to the polymer is usually from 220 to 1,900% by weight, preferably from 220 to 1,200% by weight, and more preferably from 230 to 1,000% by weight. If the compounding ratio is less than 220% by weight, the conductivity of the solid electrolyte obtained is liable to become low. On the other hand, if the compounding ratio exceeds 1,900% by weight, there is a tendency that the mechanical strength of the solid electrolyte is greatly lowered.

The electrolyte salt used for the solid electrolyte is one or more kinds selected from the group consisting of lithium fluoride, lithium chloride, lithium bromide, lithium iodide, lithium nitrate, lithium thiocyanate, lithium perchlorate, lithium trifluoromethanesulfonate, lithium tetraborofluoride, bistrifluoromethylsulfonylimide lithium, tristrifluoromethylsulfonylmethidolithium, sodium thiocyanate, sodium perchlorate, sodium trifluoromethanesulfonate, sodium tetraborofluoride, potassium thiocyanate, potassium perchlorate, potassium trifluoromethanesulfonate, potassium tetraborofluoride, magnesium thiocyanate, magnesium perchlorate, and magnesium trifluoromethanesulfonate. The ratio of the electrolyte salt to the solvent is usually in the range of from 0.2 to 3.0 mols/liter, and preferably from 0.5 to 2.0 mols/liter.

There is no particular restriction on the production method of the solid electrolyte in the solid battery of the present invention, but the solid electrolyte is obtained, for example, by preparing a homogeneous liquid (a solid electrolyte precursor) by a method of previously dissolving the electrolyte salt in the tetrafunctional terminal acryloyl-modified alkylene oxide polymer and uniformly mixing the solution with the solvent, or of uniformly mixing the tetrafunctional terminal acryloyl-modified alkylene oxide polymer and the solvent and dissolving the electrolyte salt in the mixture, etc.; thereafter, uniformly coating the homogeneous liquid on a substrate by a knife coater, a bar coater, a gravure coater, a spin coater, etc.; and then crosslinking the coated layer by the irradiation of a high-energy electromagnetic waves such as ultraviolet rays, a visible light, electron beams, etc., or by heating.

In this case, if necessary, a photopolymerization initiator such as trimethylsilylbenzophenone, benzoin, 2-methylbenzoin, 4-methoxybenzophenone, benzoin methyl ether anthraquinone, benzyl dimethyl ketal, etc., or a polymerization initiator such as benzoyl peroxide, methyl ethyl ketone peroxide, α,α'-azobisisobutyronitrile, etc., may be added.

The solid electrolyte composition precursor may be coated on a positive electrode or a negative electrode, followed by crosslinking and then used as a separator for a battery, but a composite electrode (composite positive electrode or composite negative electrode) composed of a positive electrode composite or a negative electrode composite can be prepared by uniformly mixing a positive electrode active substance or a negative electrode active substance and the solid electrolyte composition precursor and crosslinking the mixture. In this case, to improve the mechanical strength of the composite electrode, the solid electrolyte composition precursor can be further coated on the composite electrode as a separator portion, followed by crosslinking to provide a solid battery.

In case of preparing the composite electrode, an electronic conductive substance (electroconductive agent) such as graphite, carbon black, acetylene black, carbon, a metal powder, a conductive metal oxide, etc., may be incorporated.

Examples of the positive electrode material which can be used for the solid battery of the present invention include metal sulfides such as $TiS_2$, $MoS_2$, etc.; metal oxides such as $V_6O_{13}$, $V_2O_5$, etc.; lithium composite oxides such as LiCoO$_2$, LiCo$_x$Ni$_{1-x}$O$_2$ (0<x<1), LiCo$_x$Ni$_{1-(x+y)}$Al$_y$O$_2$ (0<x<1, 0<y<1 and 0<x+y<1), LiNiO$_2$, LiMnO$_2$, LiM$_2$O$_4$, etc., and further electroconductive high-molecular compounds such as polyaniline, polythiophene, polypyrrole, etc., but the positive electrode material used in the present invention is not limited to these materials.

Also, examples of the negative electrode material which can be used for the solid battery of the present invention include alkali metals such as metallic lithium, a lithium-aluminum alloy, metallic sodium, etc.; carbon materials such as graphite, coke, etc.; and further conductive high-molecular compounds capable of cation doping, such as polyacetylene, polythiophene, etc.

To constitute the solid battery of the present invention, for example, a method of casting the electrolyte before crosslinking on a negative electrode material, crosslinking the cast layer of the electrolyte by the method described above to form a solid electrolyte layer in a thin-film form, and then laminating thereon a positive electrode material; a method of forming a solid electrolyte layer in a thin-film form on a positive electrode material and further laminating thereon a negative electrode material; and a method of forming a solid electrolyte layer in a thin-layer form on both the positive electrode material and the negative electrode material and then laminating the thus formed both layers can be employed although, as a matter of course, the method of constituting the solid battery is not limited to these methods.

The following Examples are intended to illustrate the present invention more practically but not to limit the invention in any way.

(1) Synthesis of tetrafunctional terminal acryloyl-modified alkylene oxide polymer:

Synthesis Example 1 (Compound No. A-1)

In a 10-liter autoclave were placed 166 g of diglycerol as a starting material, 12.2 g of potassium hydroxide as a catalyst, and 6,280 g of ethylene oxide, and after carrying out the reaction at 130° C. for 5 hours, the reaction mixture was subjected to neutralization and desalting to obtain 6,180 g of a tetrafunctional ethylene oxide homopolymer. The weight average molecular weight (hereinafter, is referred to simply as molecular weight) of the polymer was 6,350 as calculated from the hydroxyl group value.

In a 3-liter four-necked flask were placed 1,270 g (0.2 mol) of the above-described polymer, 86.5 g (1.2 mols) of acrylic acid, 700 g of toluene, and 3 g of concentrated sulfuric acid as a catalyst, and after carrying out the reaction for 10 hours with stirring under refluxing while removing water, the reaction mixture was subjected to neutralization and desalting for purification. Then, the toluene was removed from the purified product to provide the desired tetrafunctional terminal acryloyl-modified ethylene oxide homopolymer (the compound of the formula (II) wherein R, R$^1$, m and n were as follows).

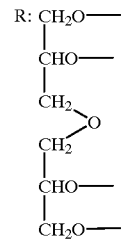

R$^1$: H, m: 35, n: 0

The molecular weight of the polymer as calculated from the result of the gel permeation chromatography (hereinafter, is referred to as GPC) was 6,570.

Synthesis Example 2 (Compound No. A-2)

In a 10-liter autoclave were placed 166 g of diglycerol as a starting material, 20 g of potassium hydroxide as a catalyst, 4,590 g of ethylene oxide, and 1,650 g of propylene oxide, and after carrying out the reaction for 7 hours at 115° C., the reaction mixture was subjected to neutralization and desalting to obtain 6,540 g of a tetrafunctional ethylene oxide-propylene oxide random copolymer. The molecular weight of the copolymer was 6,820 (as calculated from the hydroxyl group).

In a 3-liter four-necked flask were placed 1,340 g (0.2 mol) of the above-described copolymer, 86.5 g (1.2 mols) of acrylic acid, 700 g of toluene, and 4 g of concentrated sulfuric acid as a catalyst, and after carrying out the reaction for 10 hours with stirring under refluxing while removing water, the reaction mixture was subjected to neutralization and desalting for purification. Then, the toluene was removed from the purified product to provide the desired tetrafunctional terminal acryloyl-modified ethylene oxide-propylene oxide random copolymer (the compound of the formula (II) wherein R, R$^1$, R$^2$, R$^3$, m and n were as follows).

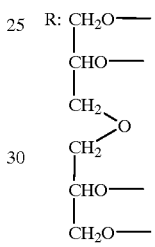

R$^1$: H, R$^2$: CH$_3$, R$^3$: H, m: 28, n: 7

The molecular weight of the polymer was 7,040 (as calculated from GPC).

Synthesis Example 3 (Compound No. A-3)

By following the same procedures as in Synthesis Example 2 except that the amounts of ethylene oxide and propylene oxide were changed to 7,040 g and 2,320 g, respectively, the desired tetrafunctional terminal acryloyl-modified ethylene oxide-propylene oxide random copolymer (the compound of the formula (II) wherein R, R$^1$, R$^2$, R$^3$, m and n were as follows) was obtained.

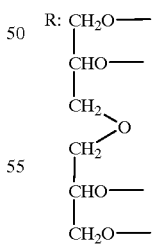

R$^1$: H, R$^2$: CH$_3$, R$^3$: H, m: 40, n: 10

The molecular weight of the polymer was 9,750 (as calculated from GPC).

Synthesis Example 4 (Compound No. A-4)

In a 20-liter autoclave were placed 166 g of diglycerol as a starting material, 53 g of potassium hydroxide as a catalyst, 10,600 g of ethylene oxide, and 6,970 g of propylene oxide, and after carrying out the reaction for 10 hours at 115° C., the reaction mixture was subjected to neutralization and desalting to obtain 17,100 g of a tetrafunctional ethylene oxide-propylene oxide random copolymer. The molecular weight of the copolymer was 17,700 (as calculated from the hydroxyl group value).

In a 5-liter four-necked flask were placed 1,770 g (0.1 mol) of the above-described copolymer, 43 g (0.6 mol) of acrylic acid, 1,500 g of toluene, and 10 g of p-toluenesulfonic acid as a catalyst, and after carrying out the reaction for 12 hours with stirring under refluxing while removing water, the reaction mixture was subjected to neutralization and desalting for purification. Then, the toluene was removed from the purified product to provide the desired tetrafunctional terminal acryloyl-modified ethylene oxide-propylene oxide random copolymer (the compound of the formula (II) wherein R, $R^1$, $R^2$, $R^3$, m and n were as follows).

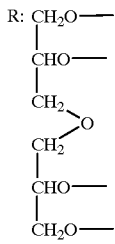

$R^1$: H, $R^2$: $CH_3$, $R^3$: H, m: 60, n: 30

The molecular weight of the polymer was 17,900 (as calculated from GPC).

Synthesis Example 5 (Compound No. A-5)

In a 25-liter autoclave were placed 166 g of diglycerol as a starting material, 58 g of potassium hydroxide as a catalyst, 5,320 g of ethylene oxide, and 13,990 g of propylene oxide, and after carrying out the reaction for 12 hours at 115° C., the reaction mixture was subjected to neutralization and desalting to obtain 19,300 g of a tetrafunctional ethylene oxide-propylene oxide random copolymer. The molecular weight of the copolymer was 19,370 (as calculated from the hydroxyl group value).

In a 5-liter four-necked flask were placed 1,937 g (0.1 mol) of the above-described copolymer, 43 g (0.6mol) of acrylic acid, 1,200 g of toluene, and 10 g of p-toluenesulfonic acid as a catalyst, and after carrying out the reaction for 12 hours with stirring under refluxing while removing water, the reaction mixture was subjected to neutralization and desalting for purification. Then, the toluene was removed from the purified product to provide the desired tetrafunctional terminal acryloyl-modified ethylene oxide-propylene oxide random copolymer (the compound of the formula (II) wherein R, $R^1$, $R^2$, $R^3$, m and n were as follows).

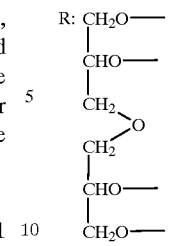

$R^1$: H, $R^2$: $CH_3$, $R^3$: H, m: 30, n: 6

The molecular weight of the polymer was 19,590 (as calculated from GPC).

Synthesis Example 6 (Compound No. A-6)

In a 30-liter autoclave were placed 136 g of pentaerythritol as a starting material, 78 g of potassium hydroxide as a catalyst, and 14,130 g of ethylene oxide, and the reaction was carried out for 11 hours at 140° C. Then, 11,700 g of propylene oxide was added to the reaction mixture, and after carrying out the reaction for 16 hours at 110° C., the reaction mixture was subjected to neutralization and desalting to obtain 25,900 g of a tetrafunctional ethylene oxide-propylene oxide block copolymer. The molecular weight of the copolymer was 26,000 (as calculated from the hydroxyl group value).

In a 5-liter four-necked flask were placed 2,600 g (0.1 mol) of the above-described copolymer, 52 g (0.6 mol) of methacrylic acid, 1,500 g of toluene, and 30 g of p-toluenesulfonic acid as a catalyst, and after carrying out the reaction for 12 hours with stirring under refluxing while removing water, the reaction mixture was subjected to neutralization and desalting for purification. Then, the toluene was removed from the purified product to provide the desired tetrafunctional terminal acryloyl-modified ethylene oxide-propylene oxide block copolymer (the compound of the formula (II) wherein R, $R^1$, $R^2$, $R^3$, m and n were as follows).

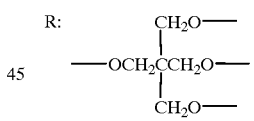

$R^1$: H, $R^2$: $CH_3$, $R^3$: $CH_3$, m: 80, n: 50

The molecular weight of the polymer was 26,230 (as calculated from GPC).

Synthesis Example 7 (Compound No. A-7)

In a 30-liter autoclave were placed 166 g of diglycerol as a starting material, 40 g of potassium hydroxide, and 11,600 g of propylene oxide, and after carrying out the reaction for 15 hours at 120° C., the reaction mixture was subjected to neutralization and desalting to obtain 11,650 g of a tetrafunctional propylene oxide homopolymer. The molecular weight of the polymer was 11,760 (as calculated from the hydroxyl group value).

In a 5-liter four-necked flask were placed 1,176 g (0.1 mol) of the above-described polymer, 43 g (0.6 mol) of acrylic acid, 1,500 g of toluene, and 12 g of p-toluenesulfonic acid as a catalyst, and after carrying out the reaction for 15 hours with stirring under refluxing while removing water, the reaction mixture was subjected to neutralization and desalting for purification. Then, the toluene was removed from the purified product to provide the desired tetrafunctional terminal acryloyl-modified propylene oxide homopolymer (the compound of the formula (II) wherein R, $R^1$, $R^3$, m and n were as follows).

R: 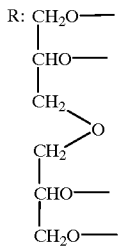

$R^1$: $CH_3$, $R^3$: H, m: 50, n: 0

The molecular weight of the polymer was 11,980 (as calculated from GPC).

Synthesis Example 8 (Compound No. A-8)

In a 20-liter autoclave were placed 136 g of pentaerythritol as a starting material, 48 g of potassium hydroxide as a catalyst, and 15,860 g of butylene oxide, and the reaction was carried out for 18 hours at 120° C. Then, the reaction mixture was subjected to neutralization and desalting to obtain 15,930 g of a tetrafunctional butylene oxide homopolymer. The molecular weight of the polymer was 15,990 (as calculated from the hydroxyl group value).

In a 5-liter four-necked flask were placed 1,599 g (0.1 mol) of the above-described polymer, 43 g (0.6 mol) of acrylic acid, 1,600 g of toluene, and 40 g of p-toluenesulfonic acid, and after carrying out the reaction for 12 hours with stirring under refluxing while removing water, the reaction mixture was subjected to neutralization and desalting for purification. Then, the toluene was removed from the purified product to provide the desired tetrafunctional terminal-modified butylene oxide homopolymer (the compound of the formula (II) wherein R, $R^1$, $R^3$, m and n were as follows).

R: 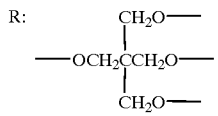

$R^1$: $C_2H_5$, $R^3$: H, m: 55, n: 0

The molecular amount of the polymer was 16,270 (as calculated from GPC).

Synthesis Example 9 (Compound No. A-9)

In a 20-liter autoclave were placed 166 g of diglycerol as a starting material, 30 g of potassium hydroxide as a catalyst, 7,040 g of ethylene oxide, and 2,880 g of butylene oxide, and the reaction was carried out for 14 hours at 110° C. Then, the reaction mixture was subjected to neutralization and desalting for purification to obtain 9,800 g of a tetrafunctional ethylene oxide-butylene oxide random copolymer. The molecular weight of the polymer was 10,090 (as calculated from the hydroxyl group value).

In a 5-liter four-necked flask were placed 1,009 g (0.1 mol) of the above-described polymer, 43 g (0.6 mol) of acrylic acid, 2,000 g of toluene, and 40 g of p-toluenesulfonic acid as a catalyst, and after carrying out the reaction for 10 hours with stirring under refluxing while removing water, the reaction mixture was subjected to neutralization and desalting for purification. Then, the toluene was removed from the purified product to provide the desired tetrafunctional terminal acryloyl-modified ethylene oxide-butylene oxide random copolymer (the compound of the formula (II) wherein R, $R^1$, $R^2$, $R^3$, m and n were as follows).

R: 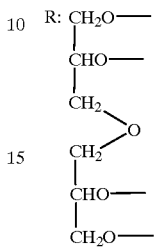

$R^1$: H, $R^2$: $C_2H_5$, $R^3$: H, m: 40, n: 10

The molecular weight of the polymer was 10,300 (as calculated from GPC).

Synthesis Example 10 (Compound No. A-10)

In a 15-liter autoclave were placed 166 g of diglycerol as a starting material, 32 g of potassium hydroxide as a catalyst, 9,290 g of propylene oxide, and 1,460 g of butylene oxide and the reaction was carried out for 16 hours at 110° C. Then, the reaction mixture was subjected to a neutralization treatment, a desalting treatment, and a purification treatment to obtain 9,900 g of a tetrafunctional propylene oxide-butylene oxide random copolymer. The molecular weight of the copolymer was 10,900 (as calculated by the hydroxyl group value).

In a 3-liter four-necked flask were placed 1,090 g (0.1 mol) of the above-described polymer, 52 g (0.6 mol) of methacrylic acid, 1,300 g of toluene, and 7.5 g of sulfuric acid as a catalyst, and after carrying out the reaction for 12 hours with stirring under refluxing while removing water, the reaction mixture was subjected to neutralization and desalting for purification. Then, the toluene was removed from the purified product to provide the desired tetrafunctional terminal methacryloyl-modified propylene oxide-butylene oxide random copolymer (the compound of the formula (II) wherein R, $R^1$, $R^2$, $R^3$, m and n were as follows).

R: 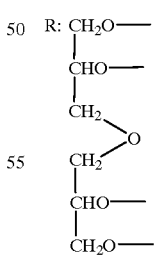

$R^1$: $CH_3$, $R^2$: $C_2H_5$, $R^3$: $CH_3$, m: 40, n: 5

The molecular weight of the polymer was 11,170 (as calculated from GPC).

The structures and the molecular weights of the tetrafunctional terminal-modified alkylene oxide polymers obtained in Synthesis Examples 1 to 10 are shown in Table 1 below.

TABLE 1

[Tetrafunctional terminal-modified alkylene oxide-modified polymer]

| Compound No. | Starting material[*1] | Monomer[*2] EO | PO | BO | Monomer disposition[*3] | Molecular weight | Terminal group[*4] | Molecular weight |
|---|---|---|---|---|---|---|---|---|
| A-1 | DG | 35 | — | — | H | 6,350 | A | 6,570 |
| A-2 | DG | 28 | 7 | — | R | 6,820 | A | 7,040 |
| A-3 | DG | 40 | 10 | — | R | 9,530 | A | 9,750 |
| A-4 | DG | 60 | 30 | — | R | 17,700 | A | 17,900 |
| A-5 | DG | 30 | 60 | — | R | 19,370 | A | 19,590 |
| A-6 | PE | 80 | 50 | — | B | 26,000 | M | 26,230 |
| A-7 | DG | — | 50 | — | H | 11,760 | A | 11,980 |
| A-8 | PE | — | — | 55 | H | 15,990 | A | 16,270 |
| A-9 | DG | 40 | — | 10 | R | 10,090 | A | 10,300 |
| A-10 | DG | — | 40 | 5 | R | 10,900 | M | 11,170 |

[*1]DG: Diglycerol, PE: Pentaerythritol
[*2]EO: Ethylene oxide, PO: Propylene oxide, BO: Butylene oxide In addition, the numeral shows the monomer unit number per polyalkylene oxide chain.
[*3]H: Homopolymer, R: Random polymer, B: Block polymer
[*4]A: Acrylate, M: Methacrylate Comparative Synthesis Example 1
(Compound No. B-1)

In a 5-liter autoclave were placed 92 g of glycerol as a starting material, 11 g of potassium hydroxide as a catalyst, 2,640 g of ethylene oxide, and 870 g of propylene oxide and the reaction was carried out for 8 hours at 115° C. Then, the reaction mixture was subjected to neutralization and desalting for purification to obtain 3,580 g of a trifunctional ethylene oxide-propylene oxide random copolymer. The molecular weight of the copolymer was 3,600 (as calculated from the hydroxyl group value).

In a 2-liter four-necked flask were placed 720 g (0.2 mol) of the above-described copolymer, 65 g (0.9 mol) of acrylic acid, 1,000 g of toluene, and 5 g of p-toluenesulfonic acid as a catalyst, the mixture was stirred under refluxing, and water was removed from the reaction mixture to provide a trifunctional terminal acryloyl-modified ethylene oxide-propylene oxide random copolymer. The molecular weight of the copolymer was 3,760 (as calculated from GPC).

Comparative Synthesis Example 2
(Compound No. B-2)

In a 10-liter autoclave were placed 106 g of diethylene glycol as a starting material, 21 g of potassium hydroxide as a catalyst, 3,530 g of ethylene oxide, and 3,500 g of propylene oxide, and the reaction was carried out for 8 hours at 120° C. Then, the reaction mixture was subjected to neutralization and desalting for purification to obtain 6,900 g of bifunctional ethylene oxide-propylene oxide random copolymer. The molecular weight of the copolymer was 7,100 (as calculated from the hydroxyl group value).

In 3-liter four-necked flask were placed 1,420 g (0.2 mol) of the above-described copolymer, 43 g (0.6 mol) of acrylic acid, 1,420 g of toluene, and 2 g of concentrated sulfuric acid as a catalyst, and after carrying out the reaction for 10 hours with stirring under refluxing while removing water, the reaction mixture was subjected to neutralization and desalting for purification. Then, the toluene was removed from the purified product to provide a desired bifunctional terminal acryloyl-modified ethylene oxide-propylene oxide random copolymer. The molecular weight of the copolymer was 7,210 (as calculated from GPC).

Comparative Synthesis Example 3
(Compound No. B-3)

In a 5-liter autoclave were placed 134 g of trimethylolpropane as a starting material, 5.9 g of potassium hydroxide as a catalyst, 1,320 g of ethylene oxide, and 522 g of propylene oxide, and the reaction was carried out for 5 hours at 115° C. Then, the reaction mixture was subjected to neutralization and desalting for purification to obtain 1,920 g of a trifunctional ethylene oxide-propylene oxide random copolymer. The molecular weight of the copolymer was 1,970 (as calculated from the hydroxyl group value).

In a 3-liter four-necked flask were placed 985 g (0.5 mol) of the above-described copolymer, 162 g (2.25 mols) of acrylic acid, 1,000 g of toluene, and 5 g of p-toluenesulfonic acid as a catalyst, and after carrying out the reaction for 10 hours with stirred under refluxing while removing water, the reaction mixture was subjected to neutralization and desalting for purification. Then, the toluene was removed from the reaction mixture to provide a trifunctional terminal acryloyl-modified ethylene oxide-propylene oxide random copolymer. The molecular weight of the copolymer was 2,130 (as calculated from GPC).

Comparative Synthesis Example 4
(Compound No. B-4)

In a 10-liter autoclave were placed 166 g of diglycerol as a starting material, 20 g of potassium hydroxide as a catalyst, 1,760 g of ethylene oxide, and 2,880 g of butylene oxide, and the reaction was carried out for 12 hours at 115° C. Then, the reaction mixture was subjected to neutralization and desalting for purification to obtain 4,790 g of a tetrafunctional ethylene oxide-butylene oxide random copolymer. The molecular weight of the copolymer was 4,800 (as calculated from the hydroxyl group value).

In a 3-liter four-necked flask were placed 480 g (0.1 mol) of the above-described copolymer, 52 g (0.6 mol) of methacrylic acid, 1,000 g of toluene, and 5 g of sulfuric acid as a catalyst, and after carrying out the reaction for 10 hours with stirring under refluxing while removing water, the reaction mixture was subjected to neutralization and desalting for purification. Then, the toluene was removed from the purified product to provide a tetrafunctional terminal acryloyl-modified ethylene oxide-butylene oxide random copolymer. The molecular weight of the copolymer was 5,010 (as calculated from GPC).

Comparative Synthesis Example 5
(Compound No. B-5)

In a 10-liter autoclave were placed 136 g of pentaerythritol as a starting material, 18 g of potassium hydroxide as a catalyst, and 3,520 g of ethylene oxide, and the reaction was carried out for 10 hours at 100° C. Then, 2,320 g of propylene oxide was added to the mixture, and after carrying out the reaction for 12 hours at 115° C., the reaction mixture was subjected to neutralization and desalting for purification to obtain 5,800 g of a tetrafunctional ethylene oxide-propylene oxide block copolymer. The molecular weight of the copolymer was 5,970 (as calculated from the hydroxyl group value).

In a 5-liter four-necked flask were placed 1,194 g (0.2 mol) of the above-described copolymer, 86.5 g (1.2 mols) of acrylic acid, 2,000 g of toluene, and 20 g of p-toluenesulfonic acid as a catalyst, and after carrying out the reaction for 10 hours with stirring under refluxing while removing water, the reaction mixture was subjected to neutralization and desalting for purification. Then, the toluene was removed from the purified product to provide a tetrafunctional terminal acryloyl-modified ethylene oxide-propylene oxide block copolymer. The molecular weight of the copolymer was 6,180 (as calculated from GPC).

The structures and the molecular weights of the copolymers obtained in these Comparative Synthesis Examples are shown in Table 2 below.

Also, to 7 g of a carbon powder as a negative electrode active substance were added 0.3 g of polyvinylidene fluoride (hereinafter, is referred to as PVDF) and 10 g of N-methyl-2-pyrrolidone to form a mixture in a paste form, the paste was coated on a copper foil, and after drying in a vacuum the coated layer at 200° C., the coated layer was press-stuck thereto at 1 ton/cm$^2$ to obtain a negative electrode having a thickness of 100 μm.

The solid electrolyte layer and the negative electrode layer were stuck to each other, and the assembly was tightly enclosed in a fluorocarbon resin-made cell shown in FIG. 1 to obtain a novel lithium solid battery.

EXAMPLE 2

To 8 g of LiCoO$_2$ as a positive electrode active substance were added 3 g of a solid electrolyte precursor made up of 1 g of Compound No. A-2 and 6 g of propylene carbonate having dissolved therein lithium perchlorate at a ratio of 0.5 mol/liter, and 2 g of acetylene black as an electroconductive agent, and after mixing them on a mortar, the mixture was cast on an aluminum plate having a thickness of 20 μm and a diameter of 12 mm, and the cast layer was crosslinked using an electro-curtain type electron beams irradiation

TABLE 2

[Comparative Copolymers]

| Compound No. | Starting material[*1] | Monomer[*2] EO | PO | BO | Monomer disposition[*3] | Molecular weight | Terminal group[*4] | Molecular weight |
|---|---|---|---|---|---|---|---|---|
| B-1 | G | 20 | 5 | — | R | 3,600 | A | 3,760 |
| B-2 | DEG | 80 | 60 | — | R | 7,100 | A | 7,210 |
| B-3 | T | 10 | 3 | — | R | 1,970 | A | 2,130 |
| B-4 | DG | 10 | — | 10 | R | 4,800 | M | 5,010 |
| B-5 | PE | 20 | 10 | — | B | 5,970 | A | 6,180 |

[*1]G: Glycerol, DEG: Diethylene glycol, T: Trimethylolpropane, DG: Diglycerol, PE: Pentaerythritol
[*2]EO: Ethylene oxide, PO: Propylene oxide, BO: Butylene oxide
In addition, the numeral shows the number of the monomer unit per polyalkylene oxide chain.
[*3]R: Random copolymer, B: Block copolymer
[*4]A: Acrylate, M: Methacrylate Then, using Compound Nos. A-1 to A-10 and Compound Nos. B-1 to B-5 produced in the above-described Synthesis Examples and Comparative Synthesis Examples, batteries were prepared as follows, and the properties of them were determined.

EXAMPLE 1

To 8 g of LiCoO$_2$ as a positive electrode active substance were added 3 g of a solid electrolyte precursor made up of 1 g of Compound No. A-1 and 4 g of propylene carbonate having dissolved therein lithium perchlorate at a ratio of 1 mol/liter, and 2 g of acetylene black as an electroconductive agent, and after mixing them on a mortar, the mixture was cast on an aluminum plate having a thickness of 20 μm and a diameter of 12 mm, and the cast layer was crosslinked using an electro-curtain type electron beams irradiation apparatus in an argon gas atmosphere under the conditions of an acceleration voltage of 250 kV and an electron beams dosage of 10 Mrads to obtain a positive electrode having a thickness of 100 μm.

After further coating the solid electrolyte precursor on the positive electrode with a wire coater, the coated layer was crosslinked using the electron beams irradiation apparatus by the same manner as described above to form a solid electrolyte layer having a thickness of 50 μm.

apparatus in an argon gas atmosphere under the conditions of an acceleration voltage of 250 kV and an electron beams dosage of 10 Mrads to obtain a positive electrode having a thickness of 100 μm.

After further coating the solid electrolyte precursor on the positive electrode with a wire coater, the coated layer was crosslinked using the electron beams irradiation apparatus by the same manner as described above to form a solid electrolyte layer having a thickness of 100 μm.

Also, to 7 g of a carbon powder added 0.3 g of PVDF and 10 g of N-methyl-2-pyrrolidone to form a mixture in a paste form, the paste was coated on a copper foil, and after drying in a vacuum the coated layer at 200° C., the coated layer was press-stuck thereto at 1 ton/cm$^2$ to obtain a negative electrode having a thickness of 100 μm.

The solid electrolyte layer and the negative electrode layer were stuck to each other, and the assembly was tightly enclosed in a fluorocarbon resin-made cell shown in FIG. 1 to obtain a novel lithium solid battery.

EXAMPLE 3

To 8 g of LiCoO$_2$ as a positive electrode active substance were added 3 g of a solid electrolyte precursor made up of 1 g of Compound No. A-3 and 6 g of γ-butyrolactone having dissolved therein lithium perchlorate at a ratio of 1.2 mols/liter, and 2 g of acetylene black as an electroconductive agent, and after mixing them on a mortar, the mixture was cast on an aluminum plate having a thickness of 20 $\mu$m and a diameter of 12 mm. After press-sticking thereto at 1 ton/cm$^2$, the cast layer was crosslinked using an electro-curtain type electron beams irradiation apparatus in an argon gas atmosphere under the conditions of an acceleration voltage of 250 kV and an electron beams dosage of 10 Mrads to obtain a positive electrode having a thickness of 100 $\mu$m.

After further coating the solid electrolyte precursor on the positive electrode with a wire coater, the coated layer was crosslinked using the electron beams irradiation apparatus by the same manner as described above to form a solid electrolyte layer having a thickness of 100 $\mu$m.

Also, to 7 g of a carbon powder were added 0.3 g of PVDF and 10 g of N-methyl-2-pyrrolidone to form a mixture in a paste form, the paste was coated on a copper foil, and after drying in a vacuum the coated layer at 200° C., the coated layer was press-stuck thereto at 1 ton/cm$^2$ to obtain a negative electrode having a thickness of 100 $\mu$m.

The solid electrolyte layer and the negative electrode layer were stuck to each other, and the assembly was tightly enclosed in a fluorocarbon resin-made cell shown in FIG. 1 to obtain a novel lithium solid battery.

EXAMPLE 4

To 8 g of LiCoO$_{0.8}$Ni$_{0.2}$O$_2$ as a positive electrode active substance were added 3 g of a solid electrolyte precursor made up of 1 g of Compound No. A-3 and 6 g of γ-butyrolactone having dissolved therein lithium perchlorate at a ratio of 1.2 mols/liter, and 2 g of acetylene black as an electroconductive agent, and after mixing them on a mortar, the mixture was cast on an aluminum plate having a thickness of 20 $\mu$m and a diameter of 12 mm. After press-sticking thereto at 1 ton/cm$^2$, the cast layer was crosslinked using an electro-curtain type electron beams irradiation apparatus in an argon gas atmosphere under the conditions of an acceleration voltage of 250 kV and an electron beams dosage of 10 Mrads to obtain a positive electrode having a thickness of 100 $\mu$m.

After further coating the solid electrolyte precursor on the positive electrode with a wire coater, the coated layer was crosslinked using the electron beams irradiation apparatus by the same manner as described above to form a solid electrolyte layer having a thickness of 100 $\mu$m.

Also, to 7 g of a carbon powder were added 0.3 g of PVDF and 10 g of N-methyl-2-pyrrolidone to form a mixture in a paste form, the paste was coated on a copper foil, and after drying in a vacuum the coated layer at 200° C., the coated layer was press-stuck thereto at 1 ton/cm$^2$ to obtain a negative electrode having a thickness of 100 $\mu$m.

The solid electrolyte layer and the negative electrode layer were stuck to each other, and the assembly was tightly enclosed in a fluorocarbon resin-made cell shown in FIG. 1 to obtain a novel lithium solid battery.

EXAMPLE 5

To 8 g of LiCo$_{0.2}$Ni$_{0.8}$O$_2$ as a positive electrode active substance were added 3 g of a solid electrolyte precursor made up of 1 g of Compound No. A-3 and 6 g of γ-butyrolactone having dissolved therein lithium perchlorate at a ratio of 1.2 mols/liter, and 2 g of acetylene black as an electroconductive agent, and after mixing them on a mortar, the mixture was cast on an aluminum plate having a thickness of 20 $\mu$m and a diameter of 12 mm. After press-sticking thereto at 1 ton/cm$^2$, the cast layer was crosslinked using an electro-curtain type electron beams irradiation apparatus in an argon gas atmosphere under the conditions of an acceleration voltage of 250 kV and an electron beams dosage of 10 Mrads to obtain a positive electrode having a thickness of 100 $\mu$m.

After further coating the solid electrolyte precursor on the positive electrode with a wire coater, the coated layer was crosslinked using the electron beams irradiation apparatus by the same manner as described above to form a solid electrolyte layer having a thickness of 100 $\mu$m.

Also, to 7 g of a carbon powder were added 0.3 g of PVDF and 10 g of N-methyl-2-pyrrolidone to form a mixture in a paste form, the paste was coated on a copper foil, and after drying in a vacuum the coated layer at 200° C., the coated layer was press-stuck thereto at 1 ton/cm$^2$ to obtain a negative electrode having a thickness of 100 $\mu$m.

The solid electrolyte layer and the negative electrode layer were stuck to each other, and the assembly was tightly enclosed in a fluorocarbon resin-made cell shown in FIG. 1 to obtain a novel lithium solid battery.

EXAMPLE 6

To 8 g of LiCo$_{0.1}$Ni$_{0.8}$Al$_{0.1}$O$_2$ as a positive electrode active substance were added 3 g of a solid electrolyte precursor made up of 1 g of Compound No. A-3 and 6 g of γ-butyrolactone having dissolved therein lithium perchlorate at a ratio of 1.2 mols/liter, and 2 g of acetylene black as an electroconductive agent, and after mixing them on a mortar, the mixture was cast on an aluminum plate having a thickness of 20 $\mu$m and a diameter of 12 mm. After press-sticking thereto at 1 ton/cm$^2$, the cast layer was crosslinked using an electro-curtain type electron beams irradiation apparatus in an argon gas atmosphere under the conditions of an acceleration voltage of 250 kV and an electron beams dosage of 10 Mrads to obtain a positive electrode having a thickness of 100 $\mu$m.

After further coating the solid electrolyte precursor on the positive electrode with a wire coater, the coated layer was crosslinked using the electron beams irradiation apparatus by the same manner as described above to form a solid electrolyte layer having a thickness of 100 $\mu$m.

Also, to 7 g of a carbon powder as a negative electrode active substance were added 0.3 g of PVDF and 10 g of N-methyl-2-pyrrolidone to form a mixture in a paste form, the paste was coated on a copper foil, and after drying in a vacuum the coated layer at 200° C., the coated layer was press-stuck thereto at 1 ton/cm$^2$ to obtain a negative electrode having a thickness of 100 $\mu$m.

The solid electrolyte layer and the negative electrode layer were stuck to each other, and the assembly was tightly enclosed in a fluorocarbon resin-made cell shown in FIG. 1 to obtain a novel lithium solid battery.

EXAMPLE 7

To 8 g of. LiCoO$_2$ as a positive electrode active substance were added 3 g of a solid electrolyte precursor made up of 1 g of Compound No. A-4, 2 g of propylene carbonate having dissolved therein lithium tetraborofluoride at a ratio of 1.0 mol/liter, and 4 g of 1,2-dimethoxyethane having dissolved therein lithium tetraborofluoride at a ratio of 1.0 mol/liter, and 2 g of acetylene black as an electroconductive agent, and after mixing them on a mortar, the mixture was cast on an aluminum plate having a thickness of 20 $\mu$m and a diameter of 12 mm. After press-struck thereto at 1 ton/cm², the cast layer was crosslinked using an electro-curtain type electron beams irradiation apparatus in an argon gas atmosphere under the conditions of an acceleration voltage of 250 kV and an electron beams dosage of 10 Mrads to obtain a positive electrode having a thickness of 100 μm.

After further coating the solid electrolyte precursor on the positive electrode with a wire coater, the coated layer was crosslinked using the electron beams irradiation apparatus by the same manner as described above to form a solid electrolyte layer having a thickness of 100 μm.

Also, to 7 g of a carbon powder were added 0.3 g of PVDF and 10 g of N-methyl-2-pyrrolidone to form a mixture in a paste form, the paste was coated on a copper foil, and after drying in a vacuum the coated layer at 200° C., the coated layer was press-stuck thereto at 1 ton/cm² to obtain a negative electrode having a thickness of 100 μm.

The solid electrolyte layer and the negative electrode layer were stuck to each other, and the assembly was tightly enclosed in a fluorocarbon resin-made cell shown in FIG. 1 to obtain a novel lithium solid battery.

EXAMPLE 8

To 8 g of $LiCoO_2$ as a positive electrode active substance were added 3 g of a solid electrolyte precursor made up of 1 g of Compound No. A-5, 1 g of ethylene carbonate having dissolved therein lithium thiocyanate at a ratio of 1.5 mols/liter, and 1 g of γ-butyrolactone having dissolved therein lithium thiocyanate at a ratio of 1.5 mols/liter, and 2 g of acetylene black as an electroconductive agent, and after mixing them on a mortar, the mixture was cast on an aluminum plate having a thickness of 20 μm and a diameter of 12 mm. After press-sticking thereto at 1 ton/cm², the cast layer was crosslinked using an electro-curtain type electron beams irradiation apparatus in an argon gas atmosphere under the conditions of an acceleration voltage of 250 kV and an electron beams dosage of 10 Mrads to obtain a positive electrode having a thickness of 100 μm.

After further coating the solid electrolyte precursor on the positive electrode with a wire coater, the coated layer was crosslinked using the electron beams irradiation apparatus by the same manner as described above to form a solid electrolyte layer having a thickness of 50 μm.

Also, to 7 g of a carbon powder as a negative electrode active substance was added 3 g of a solid electrolyte precursor made up of 1 g of Compound A-5 and 1 g of γ-butyrolactone having dissolved therein lithium thiocyanate at a ratio of 1.5 mols/liter, and after mixing them on a mortar, the mixture was cast on a copper foil having a thickness of 20 μm and a diameter of 12 mm. After press-sticking at 1 ton/cm², the cast layer was crosslinked using an electro-curtain type electron irradiation apparatus in an argon gas atmosphere under the conditions of an accelerating voltage of 250 kV and an electron beams dosage of 10 Mrads to obtain a negative electrode layer having a thickness of 100 μm.

The solid electrolyte layer and the negative electrode layer were stuck to each other, and the assembly was tightly enclosed in a fluorocarbon resin-made cell shown in FIG. 1 to obtain a novel lithium solid battery.

EXAMPLE 9

To 8 g of $LiMn_2O_4$ as a positive electrode active substance were added 3 g of a solid electrolyte precursor made up of 1 g of Compound No. A-6 and 15 g of propylene carbonate having dissolved therein lithium trifluoromethanesulfonate at a ratio of 2 mols/liter, and 2 g of acetylene black as an electroconductive agent, and after mixing them on a mortar, the mixture was cast on an aluminum plate having a thickness of 20 μm and a diameter of 12 mm. After press-sticking thereto at 1 ton/cm², the cast layer was crosslinked using an electro-curtain type electron beams irradiation apparatus to obtain a positive electrode having a thickness of 100 μm.

After further coating the solid electrolyte precursor on the positive electrode with a wire coater, the coated layer was crosslinked using the electron beams irradiation apparatus by the same manner as described above to form a solid electrolyte layer having a thickness of 50 μm.

Also, to 7 g of a carbon powder as a negative electrode active substance was added 3 g of a solid electrolyte precursor made up of 1 g of Compound A-6 and 15 g of ethylene carbonate having dissolved therein lithium trifluoromethanesulfonate at a ratio of 2 mols/liter, and after mixing them on a mortar, the mixture was cast on a copper foil plate having a thickness of 20 μm and a diameter of 12 mm. After press-sticking at 1 ton/cm², the cast layer was crosslinked using an electro-curtain type electron irradiation apparatus in an argon gas atmosphere under the conditions of an accelerating voltage of 250 kV and an electron beams dosage of 10 Mrads to obtain a negative electrode layer having a thickness of 100 μm.

The solid electrolyte layer and the negative electrode layer were stuck to each other, and the assembly was tightly enclosed in a fluorocarbon resin-made cell shown in FIG. 1 to obtain a novel lithium solid battery.

EXAMPLE 10

To 8 g of $LiMn_2O_4$ as a positive electrode active substance were added 3 g of a solid electrolyte precursor made up of 1 g of Compound No. A-7, 2.5 g of ethylene carbonate having dissolved therein lithium tetraborate at a ratio of 1 mol/liter, and 4 g of diethyl carbonate having dissolved therein lithium tetraborate at a ratio of 1 mol/liter, and 2 g of acetylene black as an electroconductive agent, and after mixing them on a mortar, the mixture was cast on an aluminum plate having a thickness of 20 μm and a diameter of 12 mm. After press-sticking thereto at 1 ton/cm², the cast layer was crosslinked using an electro-curtain type electron beams irradiation apparatus to obtain a positive electrode having a thickness of 100 μm.

After further coating the solid electrolyte precursor on the positive electrode with a wire coater, the coated layer was crosslinked using the electron beams irradiation apparatus by the same manner as described above to form a solid electrolyte layer having a thickness of 50 μm.

Also, to 7 g of a carbon powder as a negative electrode active substance were added 0.3 g of PVDF and 10 g of N-methyl-2-pyrrolidone to form a mixture in a paste form, the paste was coated on a copper foil plate having a thickness of 20 μm and a diameter of 12 mm, and the coated layer was press-stuck thereto at 1 ton/cm² to obtain a negative electrode having a thickness of 100 μm.

The solid electrolyte layer and the negative electrode layer were stuck to each other, and the assembly was tightly enclosed in a fluorocarbon resin-made cell shown in FIG. 1 to obtain a novel lithium solid battery.

EXAMPLE 11

To 8 g of $V_2O_5$ as a positive electrode active substance were added 3 g of acetylene black, 0.2 g of PVDF, and 10 g of N-methyl-2-pyrrolidone to form a mixture in a paste form, the paste was coated on a stainless steel sheet having a thickness of 20 μm and a diameter of 12 mm, and after drying in a vacuum at 200° C., the coated layer was stuck thereto at 1 ton/cm$^2$ to obtain a positive electrode having a thickness of 100 μm.

Then, after coating on the positive electrode a solid electrolyte precursor made up of 1 g of the Compound A-8 and 2.5 g of sulfolane having dissolved therein lithium perchlorate at a ratio of 0.8 mol/liter with a wire coater, the coated layer was crosslinked using an electro-curtain type electron irradiation apparatus in an argon gas atmosphere under the conditions of an acceleration voltage of 250 kV and an electron beams dosage of 10 Mrads to form a solid electrolyte layer having a thickness of 50 μm.

The above-described solid electrolyte layer and a metallic lithium layer having a thickness of 50 μm and a diameter of 12 mm as a negative electrode layer were stuck to each other, and the assembly was tightly enclosed in a fluorocarbon resin-made cell shown in FIG. 1 to obtain a novel lithium solid battery.

EXAMPLE 12

To 8 g of $V_2O_5$ as a positive electrode active substance were added 3 g of acetylene black, 0.2 g of PVDF, and 10 g of N-methyl-2-pyrrolidone to form a mixture in a paste form, the paste was coated on a stainless steel sheet having a thickness of 20 μm and a diameter of 12 mm, and after drying in a vacuum at 200° C., the coated layer was stuck thereto at 1 ton/cm$^2$ to obtain a positive electrode having a thickness of 100 μm.

Then, after coating on the positive electrode a solid electrolyte precursor made up of 1 g of the Compound A-9 and 4 g of propylene carbonate having dissolved therein lithium perchlorate at a ratio of 1.2 mol/liter with a wire coater, the coated layer was crosslinked using an electro-curtain type electron irradiation apparatus in an argon gas atmosphere under the conditions of an acceleration voltage of 250 kV and an electron beams dosage of 10 Mrads to form a solid electrolyte layer having a thickness of 50 μm.

The solid electrolyte layer and a metallic lithium layer having a thickness of 50 μm and a diameter of 12 mm as a negative electrode layer were stuck to each other, and the assembly was tightly enclosed in a fluorocarbon resin-made cell shown in FIG. 1 to obtain a novel lithium solid battery.

EXAMPLE 13

To 8 g of $LiCoO_2$ as a positive electrode active substance were added 3 g of a solid electrolyte precursor made up of 1 g of the Compound A-10 and 8 g of propylene carbonate having dissolved therein bistrifluoromethylsulfonylimidolithium at a ratio of 1.5 mols/liter, and 2 g of acetylene black as an electroconductive agent, and after mixing them on a mortar, the mixture was cast on an aluminum plate having a thickness of 20 μm and a diameter of 12 mm, and the cast layer was crosslinked using an electro-curtain type electron beams irradiating apparatus in an argon gas atmosphere under the conditions of an accelerating voltage of 250 kV and an electron beams dosage of 10 Mrads to obtain a positive electrode having of 100 μm.

Then, after further coating the solid electrolyte precursor on the positive electrode with a wire coater, the coated layer was crosslinked using the by the same manner as described above to form a solid electrolyte layer having a thickness of 50 μm.

Also, to 7 g of a carbon powder were added 0.3 g of PVDF and 10 g of N-methyl-2-pyrrolidone to form a mixture in a paste form, the past was coated on a copper foil, and after drying in a vacuum at 200° C., the coated layer was press-stuck thereto at 1 ton/cm$^2$ to obtain a negative electrode layer having a thickness of 100 μm.

The solid electrolyte layer and the negative electrode layer were stuck to each other, and the assembly was tightly enclosed in a fluorocarbon resin-made cell shown in FIG. 1 to obtain a novel lithium solid battery.

Comparative Example 1

To 8 g of $LiCoO_2$ as a positive electrode active substance were added 3 g of a solid electrolyte precursor made up of 1 g of Compound No. A-1 and 1 g of propylene carbonate having dissolved therein lithium perchlorate at a ratio of 1.0 mol/liter, and 2 g of acetylene black as an electroconductive agent, after mixing them on a mortar, the mixture was cast on an aluminum plate having a thickness of 20 μm and a diameter of 12 mm and the cast layer was crosslinked using an electro-curtain type electron beams irradiation apparatus in an argon gas atmosphere under the conditions of an acceleration voltage of 250 kV and an electron beams dosage of 10 Mrads to obtain a positive electrode having a thickness of 100 μm.

After further coating the solid electrolyte precursor on the positive electrode with a wire coater, and the coated layer was crosslinked using the electron beams irradiation apparatus by the same manner as described above to form a solid electrolyte layer having a thickness of 50 μm.

Also, to 7 g of a carbon powder were added 0.3 g of PVDF and 10 g of N-methyl-2-pyrrolidone to form a mixture in a paste form, the paste was coated on a copper foil, and after drying in a vacuum the coated layer at 200° C., the coated layer was press-stuck thereto at 1 ton/cm$^2$ to obtain a negative electrode having a thickness of 100 μm.

The solid electrolyte layer and the negative electrode layer were stuck to each other, and the assembly was tightly enclosed in a fluorocarbon resin-made cell shown in FIG. 1 to obtain a novel lithium solid battery.

Comparative Example 2

As a solid electrolyte precursor, 1 g of the Compound B-1 was mixed with 4 g of propylene carbonate having dissolved therein lithium perchlorate at a ratio of 1.0 mol/liter. While it was attempted to obtain a positive electrode by the same manner as in Example 1 using the mixture described above, the crosslinking was insufficient. Also, to make sure, it was tried to crosslink the solid electrolyte precursor singly. However, only a brittle solid electrolyte was obtained, and a battery could not be prepared.

Comparative Example 3

To 8 g of $LiCoO_2$ as a positive electrode active substance were added 3 g of a solid electrolyte precursor made up of 1 g of Compound No. B-2 and 3 g of propylene carbonate having dissolved therein lithium perchlorate at a ratio of 1.2 mols/liter, and 2 g of acetylene black as an electroconductive agent, and after mixing them on a mortar, the mixture was cast on an aluminum plate having a thickness of 20 μm and a diameter of 12 mm, and the cast layer was crosslinked using an electro-curtain type electron beams irradiation apparatus in an argon gas atmosphere under the conditions of an acceleration voltage of 250 kV and an electron beams dosage of 10 Mrads to obtain a positive electrode having a thickness of 100 μm.

After further coating the solid electrolyte precursor on the positive electrode with a wire coater, the coated layer was crosslinked using the electron beams irradiation apparatus by the same manner as described above to form a solid electrolyte layer having a thickness of 50 μm.

Also, to 7 g of a carbon powder were added 0.3 g of PVDF and 10 g of N-methyl-2-pyrrolidone to form a mixture in a paste form, the paste was coated on a copper foil, and after drying in a vacuum the coated layer at 200° C., the coated layer was press-stuck thereto at 1 ton/cm$^2$ to obtain a negative electrode having a thickness of 100 μm.

The solid electrolyte layer and the negative electrode layer were stuck to each other, and the assembly was tightly enclosed in a fluorocarbon resin-made cell shown in FIG. 1 to obtain a novel lithium solid battery.

Comparative Example 4

As a solid electrolyte precursor, 1 g of the Compound B-3 was mixed with 4 g of propylene carbonate having dissolved therein lithium perchlorate at a ratio of 2.0 mol/liter. While it was attempted to obtain a positive electrode by the same manner as in Example 1 using the mixture described above, the crosslinking was insufficient. Also, to make sure, it was tried to crosslink the solid electrolyte precursor singly. However, only a brittle solid electrolyte was obtained, and a battery could not be prepared.

Comparative Example 5

As a solid electrolyte precursor, 1 g of the Compound B-4 was mixed with 4 g of propylene carbonate having dissolved therein lithium perchlorate at a ratio of 1.0 mol/liter, and it was attempted to obtain a positive electrode by the same manner as in Example 1 using the mixture described above. However, the crosslinking was insufficient. Also, to make sure, it was tried to crosslinking the solid electrolyte precursor singly, but only a brittle solid electrolyte was obtained, and a battery could not be prepared.

Comparative Example 6

To 8 g of LiCoO$_2$ as a positive electrode active substance were added 3 g of a solid electrolyte precursor made up of 1 g of Compound No. B-5 and 1 g of propylene carbonate having dissolved therein lithium perchlorate at a ratio of 1.0 mol/liter, and 2 g of acetylene black as an electroconductive agent, and after mixing them on a mortar, the mixture was cast on an aluminum plate having a thickness of 20 μm and a diameter of 12 mm, and the cast layer was crosslinked using an electro-curtain type electron beams irradiation apparatus in an argon gas atmosphere under the conditions of an acceleration voltage of 250 kV and an electron beams dosage of 10 Mrads to obtain a positive electrode having a thickness of 100 μm.

After further coating the solid electrolyte precursor on the positive electrode with a wire coater, the coated layer was crosslinked using the electron beams irradiation apparatus by the same manner as described above to form a solid electrolyte layer having a thickness of 50 μm.

Also, to 7 g of a carbon powder were added 0.3 g of PVDF and 10 g of N-methyl-2-pyrrolidone to form a mixture in a paste form, the paste was coated on a copper foil, and after drying in a vacuum the coated layer at 200° C., the coated layer was press-stuck thereto at 1 ton/cm$^2$ to obtain a negative electrode having a thickness of 100 μm.

The solid electrolyte layer and the negative electrode layer were stuck to each other, and the assembly was tightly enclosed in a fluorocarbon resin-made cell shown in FIG. 1 to obtain a novel lithium solid battery.

The compositions of the batteries prepared in these Examples and Comparative Examples are shown in Table 3 below.

TABLE 3

[Compositions of Prepared Batteries]

| | | Positive electrode layer | | | | | | Negative electrode layer | | |
|---|---|---|---|---|---|---|---|---|---|---|
| | | | | | Solid electrolyte precursor composition | | | Negative electrode | | |
| | No. | Positive electrode active substance (g) | Binder[*1] (g) | Electro-conductive agent[*2] (g) | Compound[*3] (g) | Solvent[*4] (g) | Electrolyte salt (mol/l) | active substance (g) | Binder (g) | Note |
| Example | 1 | LiCoO$_2$ 8 | Precursor 3 | AB 2 | A-1 1 | PC 4 | LiClO$_4$ 1.0 | Carbon 7 | PVDF 0.3 | |
| | 2 | LiCoO$_2$ 8 | Precursor 3 | AB 2 | A-2 1 | PC 6 | LiClO$_4$ 0.5 | Carbon 7 | PVDF 0.3 | |
| | 3 | LiCoO$_2$ 8 | Precursor 3 | AB 2 | A-3 1 | GBL 6 | LiClO$_4$ 1.2 | Carbon 7 | PVDF 0.3 | |
| | 4 | LiCo$_{0.8}$Ni$_{0.2}$O$_2$ 8 | Precursor 3 | AB 2 | A-3 1 | GBL 6 | LiClO$_4$ 1.2 | Carbon 7 | PVDF 0.3 | |
| | 5 | LiCo$_{0.8}$Ni$_{0.2}$O$_2$ 8 | Precursor 3 | AB 2 | A-3 1 | GBL 6 | LiClO$_4$ 1.2 | Carbon 7 | PVDF 0.3 | |
| | 6 | LiCo$_{0.1}$Ni$_{0.8Al0.1}$O$_2$ 8 | Precursor 3 | AB 2 | A-3 1 | GBL 6 | LiClO$_4$ 1.2 | Carbon 7 | PVDF 0.3 | |
| | 7 | LiCoO$_2$ 8 | Precursor 3 | AB 2 | A-4 1 | PC/DME 2/4 | UBF$_4$ 1.0 | Carbon 7 | PVDF 0.3 | |
| | 8 | LiCoO$_2$ 8 | Precursor 3 | AB 2 | A-5 1 | EC/GBL 1/1 | LiSCN 1.5 | Carbon 7 | Precursor 3 | |
| | 9 | LiMn$_2$O$_4$ 8 | Precursor 3 | AB 2 | A-6 1 | PC 15 | LiCF$_3$SO$_3$ 2 | Carbon 7 | Precursor 3 | |
| | 10 | LiMn$_2$O$_4$ 8 | Precursor 3 | AB 2 | A-7 1 | EC/DEC 2.5/4 | LiBF$_4$ 1.0 | Carbon 7 | PVDF 0.3 | |
| | 11 | V$_2$O$_5$ 8 | PVDF 0.2 | AB 2 | A-8 1 | SL 2.5 | LiClO$_4$ 0.8 | Metallic Li | — | |
| | 12 | V$_2$O$_5$ 8 | PVDF 0.2 | AB 2 | A-9 1 | PC 4 | LiClO$_4$ 1.2 | Metallic Li | — | |
| | 13 | LiCoO$_2$ 8 | Precursor 3 | AB 2 | A-10 1 | PC 8 | LiN(CF$_3$SO$_2$)$_2$ 1.5 | Carbon 7 | PVDF 0.3 | |

TABLE 3-continued

[Compositions of Prepared Batteries]

| | No. | Positive electrode layer | | | | | | Negative electrode layer | | |
|---|---|---|---|---|---|---|---|---|---|---|
| | | Positive electrode active substance (g) | Binder[*1] (g) | Electro-conductive agent[*2] (g) | Solid electrolyte precursor composition | | Electrolyte salt (mol/l) | Negative electrode active substance (g) | Binder (g) | Note |
| | | | | | Compound[*3] (g) | Solvent[*4] (g) | | | | |
| Comparative Example | 1 | LiCoO$_2$ 8 | Precursor 3 | AB 2 | A-1 1 | PC 1 | LiClO$_4$ 1.0 | Carbon 7 | PVDF 0.3 | |
| | 2 | LiCoO$_2$ 8 | Precursor 3 | AB 2 | B-1 1 | PC 4 | LiClO$_4$ 1.0 | Carbon 7 | PVDF 0.3 | Not prepared |
| | 3 | LiCoO$_2$ 8 | Precursor 3 | AB 2 | B-2 1 | PC 3 | LiClO$_4$ 1.2 | Carbon 7 | PVDF 0.3 | |
| | 4 | LiCoO$_2$ 8 | Precursor 3 | AB 2 | B-3 1 | PC 4 | LiClO$_4$ 2.0 | Carbon 7 | PVDF 0.3 | Not prepared |
| | 5 | LiCoO$_2$ 8 | Precursor 3 | AB 2 | B-4 1 | PC 4 | LiClO$_4$ 1.0 | Carbon 7 | PVDF 0.3 | Not prepared |
| | 6 | LiCoO$_2$ 8 | Precursor 3 | AB 2 | B-5 1 | PC 2.5 | LiClO$_4$ 1.0 | Carbon 7 | PVDF 0.3 | |

[*1]Precursor 3
[*2]AB: Acetylene black,
[*3]See Table 1 or Table 2
[*4]PC: Propylene carbonate, DME: Dimethoxyethane, GBL: γ-Butyrolactone, EC: Ethylene carbonate, SL: Sulfolane, DEC: Diethyl carbonate On each of the solid batteries prepared in the Examples and Comparative Examples, a charging-discharging cycle test was carried out. The test conditions and the results obtained are shown in Table 4. The test was carried out at 25° C. with constant electric current charging-discharging, and the initial capacity and the cycle number of times when the capacity became 80% of the initial capacity were measured.

TABLE 4

[Battery Characteristics]

| | No. | Charging-discharging rate (C) | Charging termination voltage (V) | Discharging termination voltage (V) | Initial capacity (mAh) | Cycle No. of times when the capacity became 80% of the initial capacity (times) |
|---|---|---|---|---|---|---|
| Example | 1 | 0.05 | 4.2 | 2.5 | 3.5 | 564 |
| | 2 | 0.05 | 4.2 | 2.5 | 3.9 | 543 |
| | 3 | 0.05 | 4.2 | 2.5 | 4.1 | 602 |
| | 4 | 0.05 | 4.2 | 2.5 | 4.1 | 586 |
| | 5 | 0.05 | 4.2 | 2.5 | 4.2 | 623 |
| | 6 | 0.05 | 4.2 | 2.5 | 4.2 | 683 |
| | 7 | 0.05 | 4.1 | 3.0 | 3.7 | 550 |
| | 8 | 0.05 | 4.1 | 3.0 | 3.6 | 521 |
| | 9 | 0.05 | 4.3 | 3.0 | 3.8 | 503 |
| | 10 | 0.05 | 4.3 | 3.0 | 4.0 | 526 |
| | 11 | 0.05 | 3.2 | 2.0 | 3.5 | 582 |
| | 12 | 0.05 | 3.2 | 2.0 | 3.9 | 560 |
| | 13 | 0.05 | 4.2 | 2.5 | 4.3 | 554 |
| Comparative Example | 1 | 0.05 | 4.2 | 2.5 | 2.9 | 100 |
| | 3 | 0.05 | 4.2 | 2.5 | 2.0 | 30 |
| | 6 | 0.05 | 4.2 | 2.5 | 2.6 | 69 |

As described above, the solid battery of the present invention not only gives no liquid leakage occurring in case of using a liquid electrolyte but also has the electric capacity comparable to a battery of a liquid electrolyte system and an excellent mechanical strength by employing the specific solid electrolyte. Accordingly, the present invention can provide a solid battery having a high reliability and giving advantages for light-weighting the product incorporated with a battery and short-sizing and thinning the product, which is used as back up electric sources of electron instruments, electric sources for watches, electric sources for cameras, electric sources of pacemakers, etc.

What is claimed is:
1. A solid battery using a solid electrolyte obtained by dissolving a tetrafunctional high-molecular compound and an electrolyte salt in a solvent and crosslinking the solution by the irradiation of an actinic radiation and/or by heating, wherein the solid electrolyte is one obtained by using a tetrafunctional terminal acryloyl-modified alkylene oxide polymer having a high-molecular chain represented by following formula (II) as the above-described tetrafunctional high-molecular compound, compounding the solvent with the polymer at a ratio of from 220 to 1,900% by weight to the above-described tetrafunctional high-molecular compound, and crosslinking the compounded mixture:

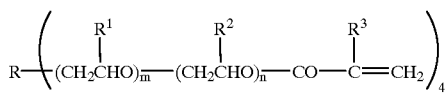
(II)

wherein R is a diglycerol residue or a pentaerythritol residue; $R^1$ and $R^2$ each represents a hydrogen atom or a lower alkyl group; $R^3$ represents a hydrogen atom or a methyl group; m and n each represents 0 or an integer of at least 1; in each high-molecular chain, $m+n \geq 35$; and each of plural $R^1$, $R^2$, $R^3$, m, and n in the four high-molecular chains may be the same or different.

2. A solid battery of claim 1, wherein the solid battery has a composite positive electrode composed of a positive electrode composite containing a positive electrode active substance and the solid electrolyte, and the solid electrolyte is disposed as a separator between the composite positive electrode and a negative electrode.

3. A solid battery of claim 2, wherein the negative electrode is a composite negative electrode composed of a negative electrode composite containing a negative electrode active substance and the solid electrolyte.

4. A solid battery of claim 1, wherein the solvent is at least one kind selected from the group consisting of cyclic esters, cyclic carbonic esters, cyclic ethers, nitriles, chain ethers, chain esters, chain carbonic esters, sulfolane, sulfolane derivatives, dimethyl sulfoxide, N,N-dimethylformamide, and N-methyloxazolidinone.

* * * * *